(12) United States Patent
Gunnarsson et al.

(10) Patent No.: US 12,101,733 B2
(45) Date of Patent: Sep. 24, 2024

(54) USER EQUIPMENT, A RADIO NETWORK NODE, A LOCATION SERVER, AND METHODS THEREIN FOR OBTAINING AND PROVIDING POSITIONING ASSISTANCE DATA

(71) Applicant: Telefonaktiebolaget LM Ericsson (publ), Stockholm (SE)

(72) Inventors: Fredrik Gunnarsson, Linköping (SE); Tao Cui, Upplands Väsby (SE); Ritesh Shreevastav, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 353 days.

(21) Appl. No.: 17/598,466

(22) PCT Filed: Mar. 18, 2020

(86) PCT No.: PCT/SE2020/050281
§ 371 (c)(1),
(2) Date: Sep. 27, 2021

(87) PCT Pub. No.: WO2020/197468
PCT Pub. Date: Oct. 1, 2020

(65) Prior Publication Data
US 2022/0353841 A1 Nov. 3, 2022

Related U.S. Application Data

(60) Provisional application No. 62/825,058, filed on Mar. 28, 2019.

(51) Int. Cl.
*H04W 64/00* (2009.01)
*H04W 36/14* (2009.01)

(52) U.S. Cl.
CPC ........... *H04W 64/00* (2013.01); *H04W 36/14* (2013.01)

(58) Field of Classification Search
CPC ..... H04W 64/00; H04W 36/14; H04W 48/12; H04W 48/14; H04W 48/18; H04W 36/0066; G01S 5/0236
See application file for complete search history.

(56) References Cited

U.S. PATENT DOCUMENTS 10,327,109 B1 * 6/2019 Maheshwari ......... H04W 4/029
10,383,081 B2 * 8/2019 Edge ..................... H04W 4/025
(Continued)

FOREIGN PATENT DOCUMENTS

WO 2014023999 A1 2/2014

OTHER PUBLICATIONS

International Search Report and Written Opinion dated Jul. 27, 2020 for International Application No. PCT/SE2020/050281 filed Mar. 18, 2020, consisting of 18-pages.
(Continued)

*Primary Examiner* — Kenneth T Lam
(74) *Attorney, Agent, or Firm* — Weisberg I.P. Law, P.A.

(57) ABSTRACT

A method performed by a UE for obtaining positioning assistance data from a location server, wherein the UE and the location server are operating in a wireless communications network. The UE receives a system information broadcast from a radio network node. The UE further transmits a request for positioning assistance data to the location server in case the UE does not obtain the needed positioning assistance data via the radio network node broadcast system information. The UE further obtains carrier and/or RAT information used for the positioning assistance data broad-
(Continued)

cast. The UE further reselects or is redirected to the carrier and/or RAT used for the positioning assistance data broadcast.

12 Claims, 11 Drawing Sheets

(56) References Cited

U.S. PATENT DOCUMENTS

| | | | | |
|---|---|---|---|---|
| 2018/0278347 | A1* | 9/2018 | Bhattad | H04W 52/325 |
| 2019/0230477 | A1* | 7/2019 | Yu | G01S 5/0236 |
| 2019/0268725 | A1* | 8/2019 | Edge | H04W 4/029 |
| 2019/0327707 | A1* | 10/2019 | Agnihotri | G01S 5/0236 |
| 2020/0053690 | A1* | 2/2020 | Fischer | H04W 48/12 |
| 2020/0154240 | A1* | 5/2020 | Edge | H04W 16/28 |
| 2020/0278451 | A1* | 9/2020 | Wei | H04W 64/00 |
| 2021/0051559 | A1* | 2/2021 | Edge | H04W 8/12 |
| 2022/0150809 | A1* | 5/2022 | Guo | H04W 48/18 |
| 2022/0173857 | A1* | 6/2022 | Michalopoulos | G01S 5/0236 |

OTHER PUBLICATIONS

3GPP TS 23.401 V15.6.0; 3rd Generation Partnership Project; Technical Specification Group Services and System Aspects; General Packet Radio Service (GPRS) enhancements for Evolved Universal Terrestrial Radio Access Network (E-UTRAN) access (Release 15); Dec. 2018, consisting of 411-pages.

3GPP TS 29.171 V15.1.0; 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLS interface (Release 15); Sep. 2018, consisting of 62-pages.

3GPP TSG-RAN WG3 #99bis R3-182220; Title: Assistance Information Broadcast Procedure in LPPa; Agenda Item: 15.1; Source: Ericsson, Nokia, Nokia Shanghai Bell; Document for: Approval; Date and Location: Apr. 16-20, 2018, Sanya, China, consisting of 3-pages.

3GPP TSG-RAN WG3 Meeting #99 R3-180908; Title: LPPa procedures for Broadcast Information Transfer; Agenda Item: 15.1; Source: Nokia, Nokia Shanghai Bell; Document for: Discussion and Decision; Date and Location: Feb. 26-Mar. 2, 2018, Athens, Greece, consisting of 3-pages.

3GPP TSG-RAN WG3 #100 meeting R3-182785; Title: Signalling procedures for broadcasting of assistance data; Agenda Item: 15.1; Source: Huawei; Document for: Discussion; Date and Location: May 21-25, 2018, Busan, South Korea, consisting of 3-pages.

3GPP TSG-SA WG2 Meeting #44 Tdoc S2-050448; Title: Velocity Request and Reporting; Source: 3GPP TSG_SA WG2; Work Item Code: LCS3; Date and Location: Jan. 26-Feb. 2, 2005; Budapest, Hungary, consisting of 28-pages.

* cited by examiner

710. Select one or more carriers where positioning SIB information is to be broadcasted.

720. Inform location server about assigned carrier/RAT for broadcast.

730. Broadcast system information.

740. Receive request from UE, to either remain at current carrier broadcasting positioning AD or to be transferred to a carrier where positioning AD is broadcasted.

750. Handover UE to carrier/RAT that broadcasts positioning assistance data.

Fig. 7

USER EQUIPMENT, A RADIO NETWORK NODE, A LOCATION SERVER, AND METHODS THEREIN FOR OBTAINING AND PROVIDING POSITIONING ASSISTANCE DATA

CROSS-REFERENCE TO RELATED APPLICATIONS

This application is a Submission Under 35 U.S.C. § 371 for U.S. National Stage Patent Application of International Application No.: PCT/SE2020/050281, filed Mar. 18, 2020 entitled "A USER EQUIPMENT, A RADIO NETWORK NODE, A LOCATION SERVER, AND METHODS THEREIN FOR OBTAINING AND PROVIDING POSITIONING ASSISTANCE DATA," which claims priority to U.S. Provisional Application No. 62/825,058, filed Mar. 28, 2019, the entireties of both of which are incorporated herein by reference.

TECHNICAL FIELD

Embodiments herein relate to a User Equipment (UE), a radio network node, a location server and methods performed therein. In particular, embodiments herein relate to obtaining and providing positioning assistance data in a wireless communication network.

BACKGROUND

In a typical wireless communication network, wireless devices, also known as wireless communication devices, mobile stations, stations (STA) and/or UE, communicate with one or more Core Networks (CN) via a Radio Access Network (RAN) which may be a Local Area Network (LAN) such as a WiFi network. The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Positioning of a UE, sometimes referred to as UE positioning, is recognized as an important feature for the LTE and the 5G networks due to its potential for massive commercial applications in for example intelligent transportation, entertainment, industry automation, robotics, remote operation, healthcare, smart parking and so on, as well as its relevance to US FCC E911 requirements.

Positioning in LTE is supported by a network architecture schematically shown in FIG. 1, which allows direct interactions between a UE and a location server, such as an Evolved Serving Mobile Location Centre (E-SMLC), via an LTE Positioning Protocol (LPP). Moreover, there are also interactions between the location server and the eNodeB via an LPPa protocol, to some extent supported by interactions between an eNodeB and the UE via a Radio Resource Control (RRC) protocol.

The following positioning techniques may be considered in LTE:
   Enhanced Cell ID. Essentially, cell ID information is used to associate a UE to a serving area of a serving cell, and then additional information is used to determine a finer granularity position.
   Assisted Global Navigation Satellite System (GNSS). Positioning is based on GNSS information retrieved by the UE, supported by assistance information provided to the UE from E-SMLC.
   Observed Time Difference of Arrival (OTDOA). The UE estimates the time difference of reference signals from different base stations and sends the time difference of the reference signals to the E-SMLC as a basis for positioning by multilateration.
   Uplink Time Difference of Arrival (UTDOA). The UE is requested to transmit a specific waveform that is detected by multiple location measurement units, e.g. an eNB, at known positions. These measurements are forwarded to the E-SMLC as a basis for positioning by multilateration.

Recent enhancements in the GNSS technology include Real Time Kinematic (RTK) GNSS, which is a differential GNSS positioning technology which enables positioning accuracy improvement from metre level to decimetre or even centimetre level in the right conditions in real-time by exploiting the carrier phase of the GNSS signal rather than only the code phase. Support for RTK GNSS in LTE networks should therefore be provided and are under standardization in the 3GPP Release 15 work item. The support for RTK in LTE networks comprises providing RTK correction data as part of positioning assistance data to the UE via the LPP. Three provisioning means of positioning assistance data to the UE are supported:

Unicast via a user plane connection,
Unicast via a control plane connection,
Broadcast via System Information Broadcast (SIB).

The broadcast provisioning would be supported by NR devices, thus NR broadcast is also a plausible enhancement that can be specified.

SUMMARY

Among other things, it is an object of embodiments herein to provide a mechanism that enables accurate and/or efficient positioning of UEs.

According to an aspect the object is achieved by providing a method performed by a UE for obtaining positioning assistance data from a location server. The UE and the location server operate in a wireless communications network. The UE receives a system information broadcast from a radio network node. The UE transmits a request for positioning assistance data to the location server in case the UE does not obtain the needed positioning assistance data via the radio network node broadcast system information. The UE further obtains carrier and/or RAT information used for the positioning assistance data broadcast. The UE then reselects or is redirected to the carrier and/or RAT used for the positioning assistance data broadcast.

According to another aspect the object is achieved by providing a method performed by a radio network node for obtaining positioning assistance data from a location server. The radio network node and the location server operate in a wireless communications network. The radio network node selects one or more carriers where positioning system information is to be broadcasted. The radio network node further broadcasts the positioning system information.

According to yet another aspect of embodiments herein, the object is achieved by providing a method performed by a location server for providing positioning assistance data. The location server operates in a wireless communications network. The location server configures broadcast assistance data for a radio network node (220). The location server further obtains carrier information from the radio network node. The location server further obtains a request for a positioning assistance data broadcast from a UE. The location server further determines whether to redirect the UE to a carrier with broadcast positioning assistance data or to provide positioning assistance data via unicast to the UE.

According to still another aspect of embodiments herein, the object is achieved by providing a UE for obtaining positioning assistance data from a location server. The UE and the location server operate in a wireless communications network. The UE is configured to receive a system information broadcast from a radio network node. The UE is further configured to transmit a request for positioning assistance data to the location server in case the UE does not obtain the needed positioning assistance data via the radio network node broadcast system information. The UE is further configured to obtain carrier and/or RAT information adapted to be used for a positioning assistance data broadcast. The UE is then further configured to reselect or redirect the carrier and/or RAT adapted to be used for the positioning assistance data broadcast.

According to still another aspect of embodiments herein, the object is achieved by providing a first network node for obtaining positioning assistance data from a location server. The radio network node and the location server operate in a wireless communications network. The radio network node is configured to select one or more carriers where positioning system information is to be broadcasted. The radio network node is further configured to broadcast the positioning system information.

According to still another aspect of embodiments herein, the object is achieved by providing a first network node providing positioning assistance data. The location server operates in a wireless communications network. The location server is configured to configure broadcast assistance data for a radio network node. The location server is further configured to obtain carrier information from the radio network node. The location server is then further configured to obtain a request for a positioning assistance data broadcast from a UE. The location server is configured to determine whether to redirect the UE to a carrier with broadcast positioning assistance data or to provide positioning assistance data via unicast to the UE.

It is furthermore provided herein a computer program product comprising instructions, which, when executed on at least one processor, cause the at least one processor to carry out the method above, as performed by the UE, the radio network node or the location server respectively. It is additionally provided herein a computer-readable storage medium, having stored thereon a computer program product comprising instructions which, when executed on at least one processor, cause the at least one processor to carry out the method according to the method above, as performed by the UE, the radio network node or the location server, respectively.

Embodiments herein enable accurate provisioning of positioning assistance data based on a selective carrier/RAT whereby minimizing network (NW) resources at the same time providing AD with low latency by means of redirecting the UE to the correct carrier/RAT.

BRIEF DESCRIPTION OF THE DRAWINGS

Examples of embodiments herein are described in more detail with reference to attached drawings in which:

FIG. 7 is a flowchart depicting embodiments of a method performed by a radio network node;

DETAILED DESCRIPTION

Figure 1:
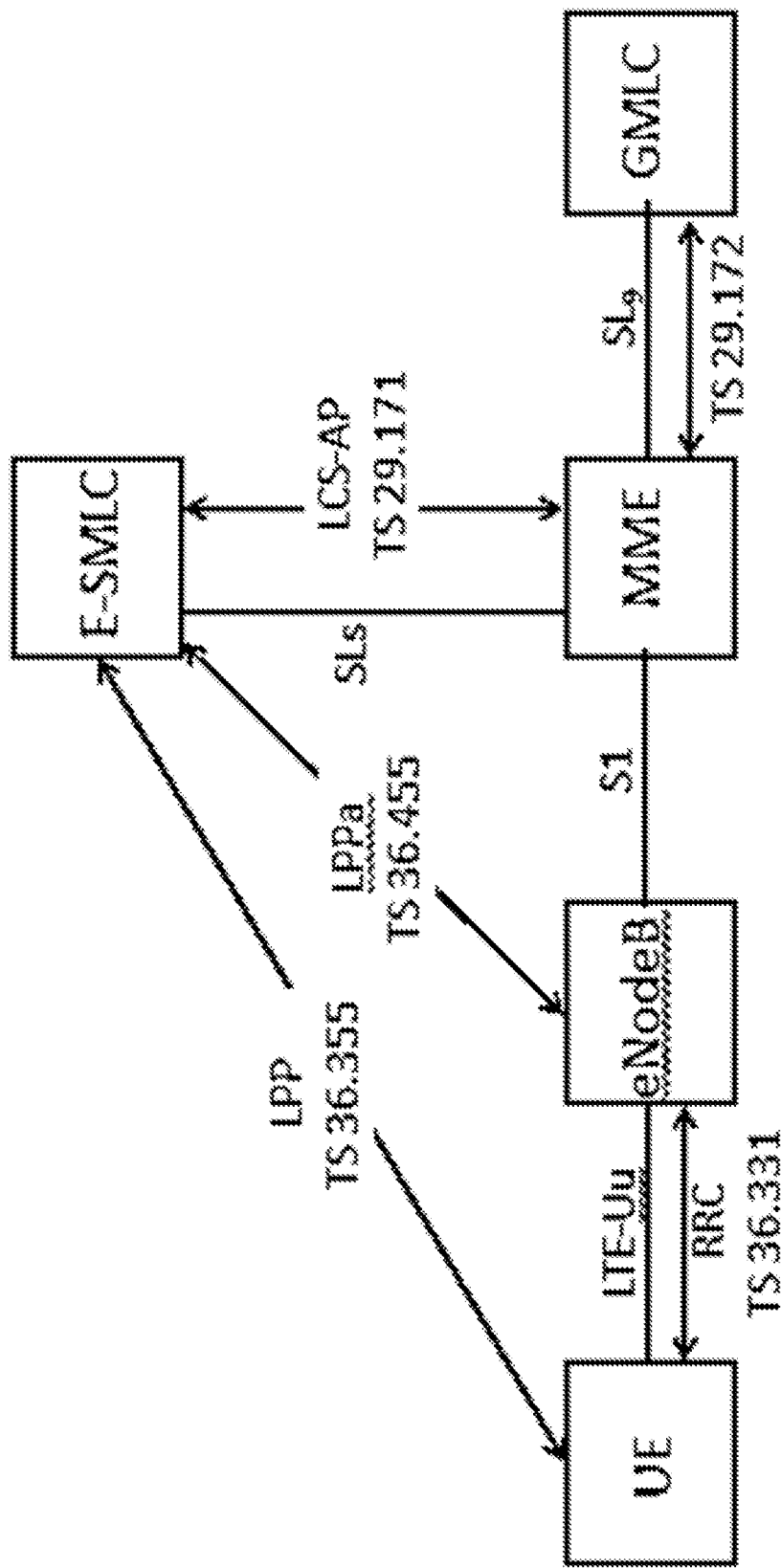
FIG. 1 is a schematic overview depicting a network architecture supporting positioning in LTE.

As a part of developing embodiments herein, a problem that may occur in wireless communication will first be identified and discussed. Throughout the following description, the UE mentioned herein that receives broadcasted information could instead be denoted a target device, depending on which terminology is preferred.

For broadcast, there may be multiple SIBs that may be needed to be transmitted to provide useful information to UEs.

Real Time Kinematics (RTK) is one of the positioning assistance data (AD) that needs to be supported in 3GPP Release 15. This data may be divided into common and generic message types. Common messages are not associated with GNSS-ID whereas generic messages are associated with GNSS-ID.

Common assistance data may be:
a) GNSS-RTK-ReferenceStationInfo
b) GNSS-RTK-CommonObservationInfo
c) GNSS-RTK-AuxiliaryStationData Generic message data may be:
a) GNSS-RTK-Observations
b) GLO-RTK-BiasInformation for GLONASS (GLObal NAvigation Satellite System)
c) GNSS-RTK-MAC-Correction Differences
d) GNSS-RTK-Residuals
e) GNSS-RTK-FKP-Gradients
f) GNSS-State Space Representation (SSR)-OrbitCorrections
g) GNSS-SSR-ClockCorrections
h) GNSS-SSR-CodeBias Observed Time Difference of Arrival (OTDOA) specific information is another type of Assistance Data that also needs to be broadcasted as shown in a table below.

| | assistanceDataElement |
|---|---|
| GNSS Common Assistance Data | GNSS-ReferenceTime |
| | GNSS-ReferenceLocation |
| | GNSS-IonosphericModel |
| | GNSS-EarthOrientationParameters |
| | GNSS-RTK-ReferenceStationInfo |
| | GNSS-RTK-CommonObservationInfo |
| | GNSS-RTK-AuxiliaryStationData |
| GNSS Generic Assistance Data | GNSS-TimeModelList |
| | GNSS-DifferentialCorrections |
| | GNSS-NavigationModel |
| | GNSS-RealTimeIntegrity |
| | GNSS-DataBitAssistance |
| | GNSS-AcquisitionAssistance |
| | GNSS-Almanac |
| | GNSS-UTC-Model |
| | GNSS-AuxiliaryInformation |
| | BDS-DifferentialCorrections |
| | BDS-GridModelParameter |
| | GNSS-RTK-Observations |
| | GLO-RTK-BiasInformation |
| | GNSS-RTK-MAC-CorrectionDifferences |
| | GNSS-RTK-Residuals |
| | GNSS-RTK-FKP-Gradients |
| | GNSS-SSR-OrbitCorrections |
| | GNSS-SSR-ClockCorrections |
| | GNSS-SSR-CodeBias |
| OTDOA Assistance Data | OTDOA UE Assisted |
| | OTDOA UE Based |
| | OTDOA UE Assisted NB |
| | OTDOA UE Based NB |

A concern with the current procedures for periodic positioning assistance data provisioning via broadcast is that a high amount of resources, e.g. Time-Frequency grid, subframes, may be consumed to broadcast a large number of positioning SIBs, herein also referred to as posSIBs for short. In many networks, there may be multiple carriers used for broadcasting information, thus broadcasting the same or corresponding information in each carrier may be expensive in terms of consumed resources.

Further, the positioning SIB broadcast functionality may be distributed between a base station and a location server. The location server prepares the AD and it is the base station, e.g. gNB, which delivers the AD to a UE using RRC broadcast. The intended solution should preferably not disrupt the functionality of each node.

The embodiments herein may be used to achieve an improved providing of positioning assistance data to UEs, whereby the performance of a wireless communications network can be generally improved. Further, providing the mechanisms to the network can save radio resources.

To solve the problem identified above, only a subset of carrier/RAT(s) may be used for broadcasting positioning SIBs and a mechanism to inform and/or redirect the UE to such carrier/RAT(s) is also provided.

According to some embodiments herein, some method steps or actions that may be performed from a UE or target device perspective are listed below:

The UE receives a system information broadcast from a radio network node.

The UE requests positioning assistance data.

The UE obtains carrier/RAT information where positioning SIBs are broadcasted.

The UE is redirected to that carrier/RAT or the UE autonomously selects the carrier/RAT. The radio network node may take into account UE Reference Signal Received Power (RSRP) and/or Reference Signal Received Quality (RSRQ) results of target frequency for redirection or the UE as part of an autonomous decision may take into account its RSRP/RSRQ results of the target frequency. The UE optionally stores the carrier/RAT information.

According to some further embodiments herein, some method steps or actions that may be performed from a location server perspective are listed below:

The location server prepares, e.g. configures, broadcast assistance data for a radio network node The location server obtains from a radio network node carrier/RAT information where positioning assistance data is transmitted.

The location server obtains from a UE a positioning assistance data request.

The location server provides information to the UE including the carrier/RAT information indicating where positioning assistance data is transmitted, and the information may also include a redirection flag to redirect the UE to carrier/RAT where positioning assistance data is transmitted.

Alternatively, the location server provides the above information to the radio network node which then redirects the UE to the carrier/RAT where positioning assistance data is transmitted.

According to some further embodiments herein, some method steps or actions that may be performed from a radio network node perspective are listed below:

The radio network node selects the optimum carrier/RAT where positioning assistance data is broadcasted.

The radio network node may inform a location server and/or UE about the selected carrier/RAT via redirection or broadcast.

Optionally, the radio network node redirects the UE to carrier/RAT where positioning assistance data is delivered.

The radio network node broadcasts the positioning system information.

Figure 2:
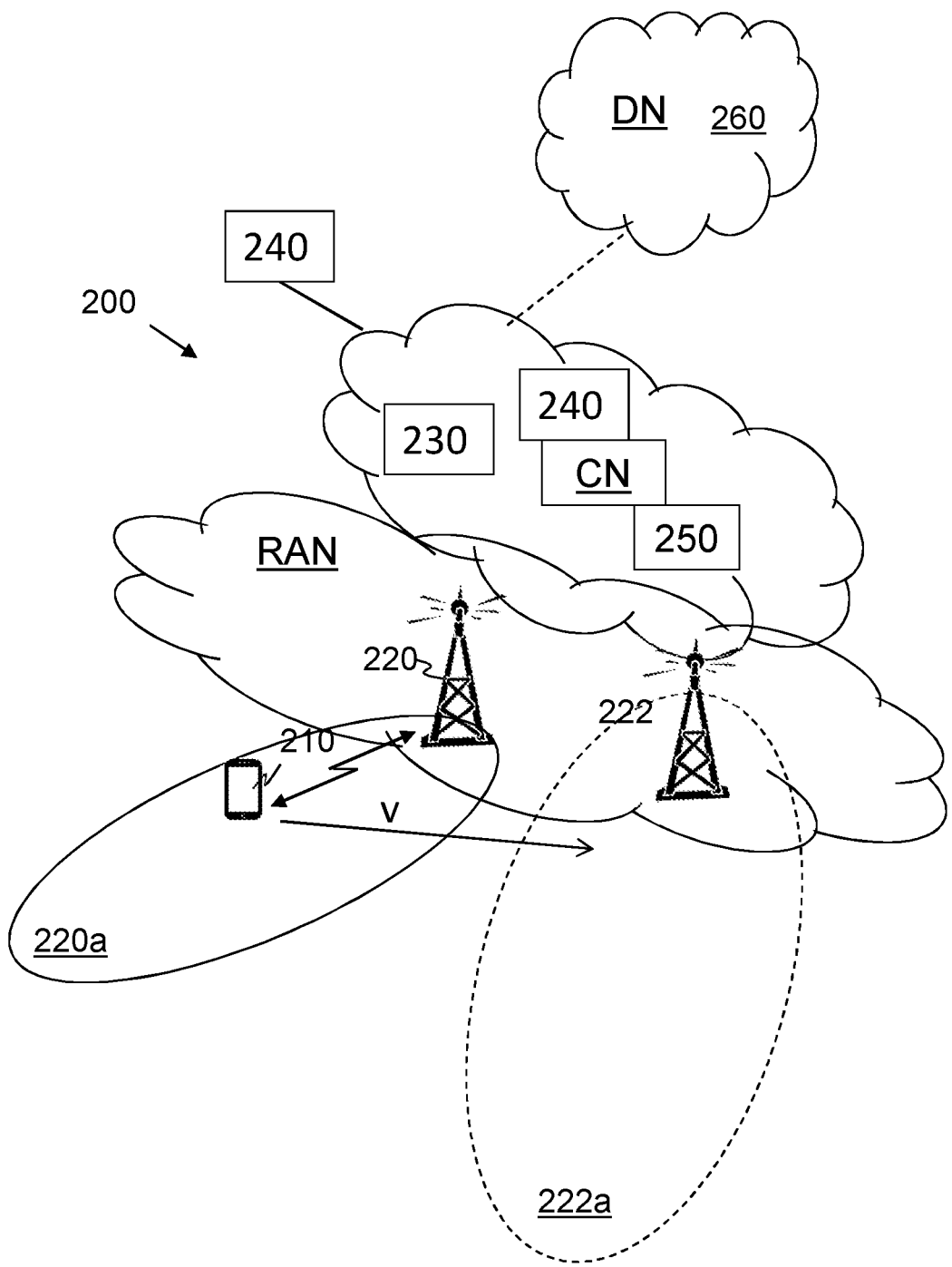
FIG. 2 is a schematic communication scenario illustrating embodiments of a wireless communications network.

Embodiments herein relate to wireless communication networks in general. FIG. 2 is a schematic overview depicting a communication scenario in a wireless communications network 200. The wireless communications network 200 may be referred to as a radio communications network. The wireless communications network 200 comprises one or more Radio Access Networks (RANs) and one or more Core Networks (CNs). The wireless communications network 200 may use a number of different technologies, such as NB-IoT, CAT-M, enhanced Machine Type Communication (eMTC), Long Term Evolution (LTE), LTE-Advanced, 5G, New Radio (NR), Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 200 is referred to as just a network.

In the wireless communication network 200, wireless devices e.g. a wireless device 210 also referred to as a UE 210, is operating in the wireless communications network 200. One or more further wireless devices may operate in the wireless communications network 200. As schematically illustrated in FIG. 2, the wireless device 210 may communicate with a network node, e.g. a radio network node 220 which will be described below.

The wireless device 210 may e.g. be a mobile station, a non-Access Point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell. In this disclosure, the wireless device 210 is sometimes referred to as a target device, and the terms wireless device and target device may be used interchangeably.

Network nodes operate in the radio communications network 200, such as a radio network node 220 also referred to as a radio network node 220, providing radio coverage over a geographical area, a service area 220*a*, which may also be referred to as a cell, a beam or a beam group of a Radio Access Technology (RAT), such as 5G, LTE, Wi-Fi, NB-IoT, CAT-M, Wi-Fi, eMTC or similar. Another radio network node 222 is operating in the wireless communications network 200 and provides radio coverage over a geographical area, a service area 222*a*, which may also be referred to as a cell, a beam or a beam group of a Radio Access Technology (RAT), such as 5G, LTE, NB-IoT, CAT-M, Wi-Fi, eMTC or similar. The radio network nodes 220, 222 may be transmission and reception points e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the radio network nodes 220, 222 depending e.g. on the radio access technology and terminology used. The radio network nodes 220, 222 may be referred to as serving radio network nodes and communicate with the wireless device 210 with Downlink (DL) transmissions to the wireless device 210 and Uplink (UL) transmissions from the wireless device 210.

Further network nodes operate in the radio communications network 200, such as a core network node 250. The core network node 250 may be a Mobility Management Entity (MME) which is a control node for an LTE access network, a Serving Gateway (SGW), and a Packet Data Network Gateway (PGW). An MME is, among other things, responsible for tracking and paging procedures which may include retransmissions. Further, the core network node 250 may be an Operation And Maintenance (OAM) node such as an Operation and Support System Radio and Core (OSS-RC) node or an Ericsson Network Management (ENM) node. As another example, the core network node 250 may be an Access Management Function (AMF) of the 5G core network.

A location server 230 and a positioning server 240 operate in the radio communications network 200. For example, the location server 230 may be an E-SM LC as in LTE or a Location Management Function (LMF) as in 5G and the positioning server 240 may be an RTK server. The location server 230 and the positioning server 240 may communicate with each other over a suitable communications interface.

It should be understood that the positioning server 240 may be arranged external of the radio communications network 200, as indicated in the figure, and in such a scenario the positioning server 240 may be referred to as an external positioning server 240 and the location server 230 and the positioning server 240 may communicate over an IP interface.

The positioning server 240 may sometimes herein be referred to as an RTK server, a Network RTK server or an RTK network provider.

Several of the embodiments and examples herein will be described with reference to FIG. 2 as an example although they are not limited to this communication scenario and wireless communications network 200. Further, the radio network node 220 or 222 will frequently be denoted an eNB or base station and these terms are thus used interchangeably throughout this description depending on which terminology is preferred.

Embodiments herein concern a positioning procedure that may be applied in the communication scenario in FIG. 2, where the UE 210 is supported by the location server 230, which is configured to provide broadcast positioning AD via the radio network node 220. The radio network node 220 is configured to further broadcast AD in certain frequencies, such as F1 or F2. The radio network nodes, 220 is associated to the core network node 250, which may route messages between the UE 210 and the location server 230 via the serving base stations, e.g. the radio network node 220. The core network node 250 may also interact with the radio network node 220, while the radio network node 220 may have a direct signaling interface.

A network operator may have multiple frequencies or frequency bands such that the operator may use features such as Inter-frequency load sharing to steer UEs from one frequency to another to balance the load. Further, certain frequencies, e.g. from lower frequency band, may have better coverage than the frequencies from higher frequency band. In such cases operator may steer certain type of traffic to frequency with larger coverage, for example Voice services. The operator may also operate several radio access technologies (RATs), where the RATs may be assigned to different carriers, but it may also be possible that several RATs are operational within the same carrier, either spatially with different RAT combinations at different base stations, or even embedded where multiple RATs are combined at the same carrier. In the following, the use of separate carriers is discussed, but the embodiments herein may also apply to the case with separate RATs and/or carriers.

The LTE system information broadcast may be useful information which helps the UE 210 to camp on a cell and perform other idle mode procedures such as drx operations, cell selection and cell reselection etc. Furthermore, important information such as emergency warning and messages, Earthquake & Tsunami Warning System (ETWS) and Commercial Mobile Alert System (CMAS) etc. may also be broadcasted using RRC SIBs. These SIBs may be broadcasted in all cells, i.e. they are configured in all carriers. In 3GPP Release 15, the system information broadcast was extended to support broadcast of positioning services. It is considered more as a value-added service. It is resource consuming to broadcast posSIBs in every cell and there may not be many users requiring this service. In such cases, it may be beneficial that a radio network node such as an eNB broadcasts the posSIBs in only certain frequencies.

For resource optimization, broadcast of positioning assistance data may be supported in a selective carrier/RAT.

The posSIBs functionality is split between RRC, LPPa and LPP procedures. The SIBs are transmitted by an eNB, e.g. radio network node 220, using an RRC SIB broadcast whereas the message is prepared, segmented, and also the validityTags are inserted by the location server and delivered to the eNB using LPPa.

Figure 3:
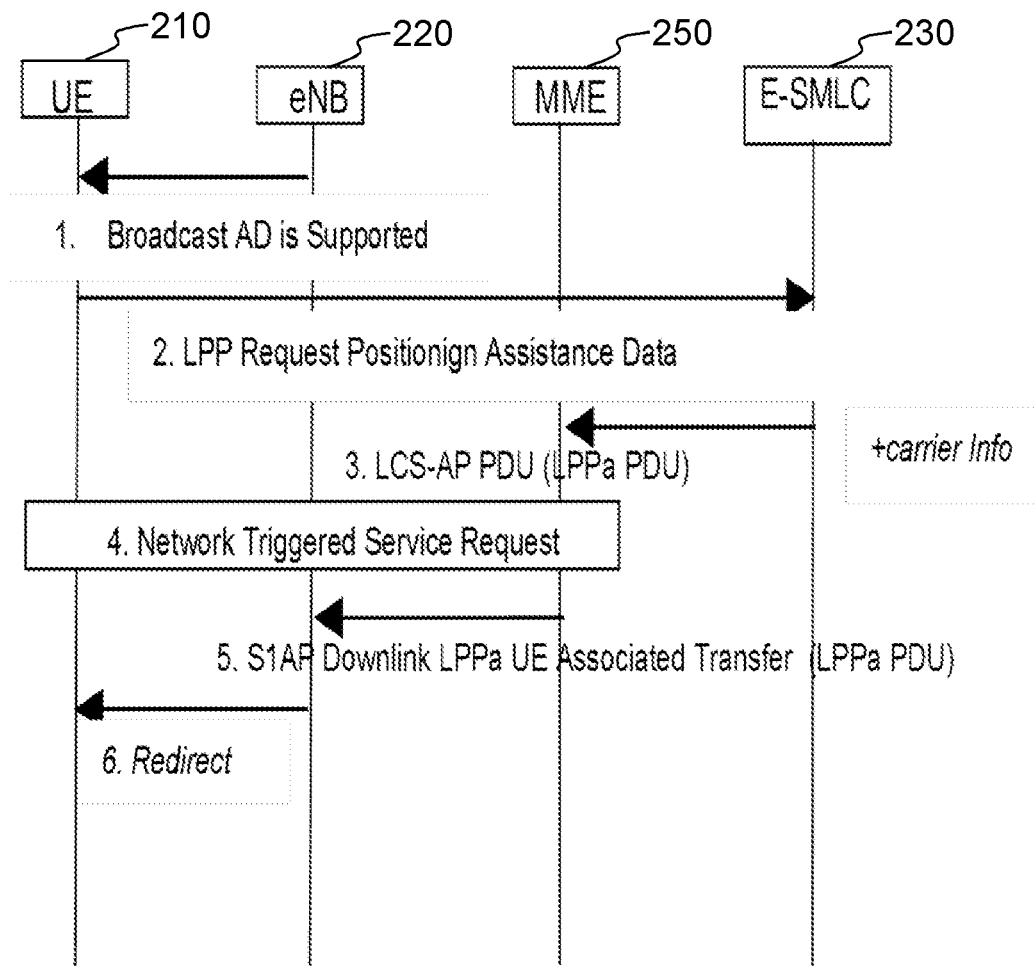
FIG. 3 is a combined signalling scheme and flowchart depicting some embodiments herein.

Based upon above discussions, embodiments herein provide a solution for providing positioning AD, and an example of how such a solution could be realized in practice is shown in FIG. 3. The embodiments herein propose to broadcast posSIBs only in one carrier or certain carriers instead of broadcasting them in all carriers such that network resources are more efficiently utilized.

The sequence of actions or steps 1-6 in FIG. 3 is as below:
1: The eNB, e.g. the radio network node 220, uses a SIB message, for instance SIB1, to provide information to the UE 210 which informs the UE that positioning AD broadcast is supported. In SIB1, it is either the schedulingInfo for posSIB or an indication that posSIBs are broadcasted on other carriers that will be provided. This step may be optional or conditional depending upon whether the eNB does or does not support the carrier where the posSIB is broadcasted.
2: If the UE 210 cannot receive the posSIB in the carrier where the UE 210 is residing, i.e. listens to, then in an LPP message Request Assistance Data the UE 210 includes or indicates an interest to receive a broadcasted message. This step may again be conditional or optional, e.g. if the eNB does not support the carrier where posSIB is broadcasted.
3: The E-SM LC, e.g. the location server 230, determines whether the UE 210 requires unicast or broadcast or a combination of both. If the E-SMLC determines that broadcast is needed, then it sends an LCS-AP PDU, as specified in 3GPP TS 29.171, to the MME, e.g. the core network node 250, including the Correlation ID corresponding to the UE 210 and carrying an LPPa PDU comprising the message that indicates an interest of receiving a broadcasted message with positioning AD. This may also include the carrier/RAT information.
4: If the UE 210 is in ECM-IDLE state, e.g. if the S1 connection was previously released due to data and signalling inactivity, the MME performs a network triggered service request as defined in 3GPP TS 23.401 in order to establish a signaling connection with the UE 210 and assign a serving eNodeB, e.g. the radio network node 220.
5: The MME forwards the LPPa PDU to the serving eNodeB in an S1AP Downlink UE Associated LPPa Transport message over the S1 signalling connection corresponding to the UE 210 and includes the Routing ID related to the E-SMLC. The MME need not retain state information for this transfer—e.g. any response in step 4 can be communicated as a separate non-associated transfer.
6: Upon receiving the message from the MME, the eNB then redirects the UE 210 to the carrier/RAT where positioning AD is delivered.

Methods according to embodiments herein may be performed by any of the radio network nodes 220, 222, the UE 210, the location server 230 and/or by the positioning server 240. As an alternative, a Distributed Node (DN) and functionality, e.g. comprised in a cloud 260 may be used for performing or partly performing the methods.

Figure 4:
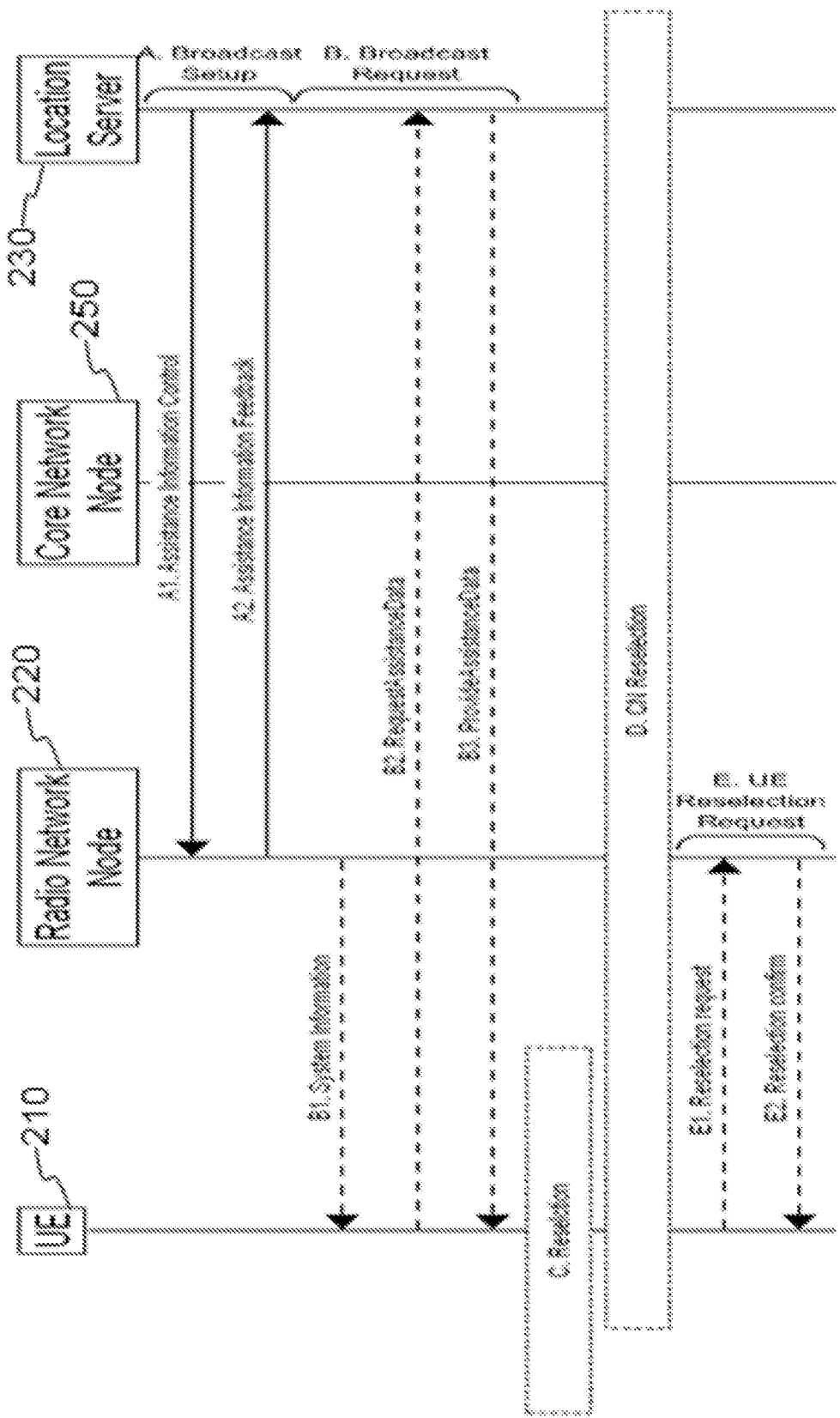
FIG. 4 is another combined signalling scheme and flowchart depicting some embodiments herein.

The different embodiments may for example be supported by a non-limiting but illustrative signalling procedure as illustrated by FIG. 4 where a series of sub-procedures A-E are performed as follows.

A. Broadcast Setup

The setup of the positioning assistance data is the same as is used when updating the positioning assistance data content for broadcast, i.e. the assistance data control. The broadcast is configured with the LPPa/NRPPa Assistance Information Control message (A1). The radio network node 220 may optionally include information about the assigned carrier/RAT for the broadcast in the Assistance Information Feedback message (A2).

B. Broadcast Request

The UE 210 may retrieve information in a broadcast (B1) transmitted from the serving radio network node, e.g. the radio network node 220. This may be the broadcast of the positioning assistance data, confirming to the UE 210 that this data is available in the serving/camping radio network node 220. This data may also include information about which carrier/RAT that provides positioning assistance data broadcast. The information may be provided in a system information block (SIB), for example SIB1, or a different SIB.

The UE 210 may also send a request for positioning assistance data to the location server 230 via LPP (B2). In the message, the UE 210 may include information about the cell ID of the serving cell. The request message may be triggered by lack of broadcasted positioning AD in the serving/camping cell. The information may be a mobile originated location request to the core network node 250 (MME in LTE).

The response ProvideAssistanceData or similar (B3) may include information about which carrier/RAT is used for the positioning AD broadcast. The location server 230 may also determine whether the positioning AD is provided via unicast or broadcast.

C. Reselection

The UE 210 may autonomously reselect to the carrier/RAT where the positioning AD broadcast is provided, i.e. transmitted. The UE 210 may wait until it is released to idle and then reselect the carrier/RAT.

D. Core Network Reselection

The location server 230 may trigger the core network node 250 to order the serving radio network node 220 to handover the UE 210 to the carrier/RAT that broadcasts the positioning assistance data. This typically involves exchange of messages between the location server 220 and the core network node 250, the core network node 250 and the serving radio network node 220, e.g. S1 in LTE, N2 in 5G, and the radio network node 220 and the UE 210 (RRC).

The location server 230 may determine whether the UE 210 requires unicast or broadcast or a combination of both. If broadcast is considered, then the location server 230 may send a message to the core network node 250, e.g. a LCS-AP PDU, as specified in 3GPP TS 29.171 to the MME in case of LTE including the Correlation ID corresponding to the UE 210 and carrying an LPPa PDU comprising the message, similar for NR/5G and other RATs. This may also include the carrier where the positioning AD is broadcasted.

If the UE 210 is in ECM-IDLE state, e.g. if the S1 connection was previously released due to data and signaling inactivity, the core network node 250 performs a network triggered service request as defined in 3GPP TS 23.401 in order to establish a signaling connection with the UE 210 and assign a serving radio network node 220.

The core network node 250, e.g. MME, forwards the message, e.g. LPPa/NRPPa PDU to the serving radio network node 220, e.g. eNode B in an S1AP Downlink UE Associated LPPa Transport message over the S1 signaling connection corresponding to the UE 210 and includes the Routing ID related to the E-SMLC in case of LTE. The core network node 250 needs not retain state information for this transfer, e.g. it can treat any response as a separate non-associated transfer.

Upon receiving the message from core network node 250, e.g. MME, the radio network node 220, or eNB, then redirects the UE 210 to the carrier where the positioning AD is delivered. In some initial cases, the radio network node 220 may just collect the information where the UE 210 is interested in listening to the positioning AD.

E. UE Reselection Request

The UE 210 may request the serving radio network node 220 (E1) to be handed over to the carrier/RAT where the positioning AD is broadcasted. The request may include the target carrier/RAT, or may let the radio network node 220 direct the UE 210 to the correct carrier/RAT without information from the UE 210 other than the request itself.

The radio network node 220 may release the UE 210 to idle mode with a redirection to a specific carrier/RAT, or may command the UE 210 to change carrier/RAT while connected (E2).

Figure 5:
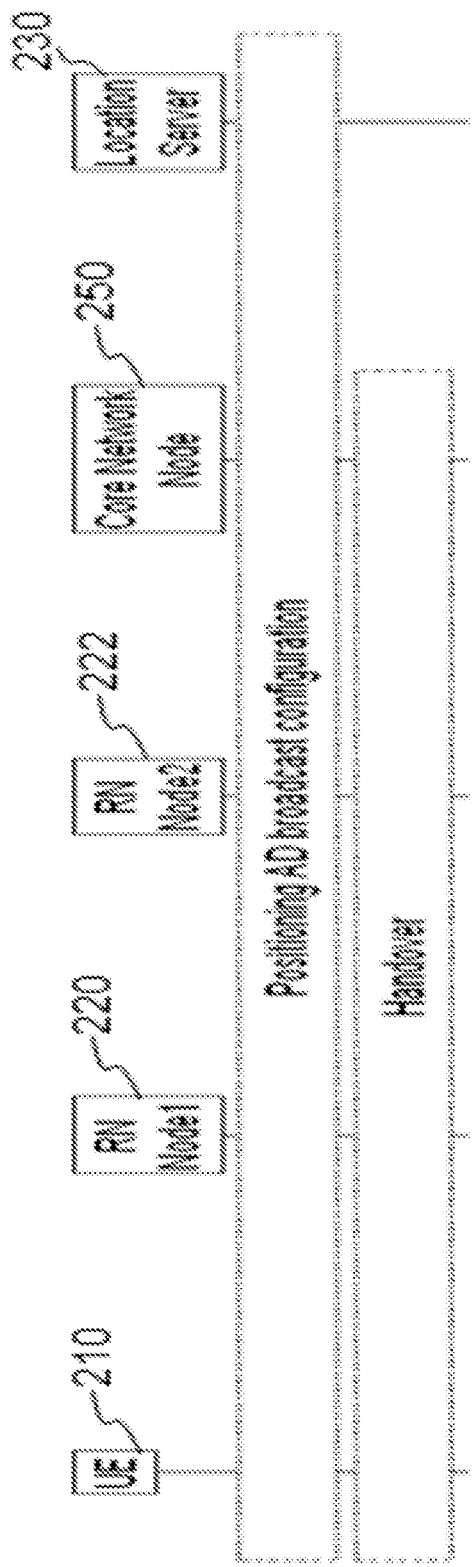
FIG. 5 is another combined signalling scheme and flowchart showing signaling flows with handover of a UE.

FIG. 5 shows signaling flows with handover of the UE 210 from a first radio network (RN) node 1, e.g. the radio network node 220, to a second RN node 2, e.g. the radio network node 222. In terms of handover, the first RN node 1 is also referred to as a source RN node and second RN node 2 is also referred to as a target RN node.

In FIG. 5, the setup of broadcast and configuration of the UE 210 for positioning AD broadcast at the correct carrier can be completed as discussed above.

The second part of this figure indicates a handover procedure, characterized by:

In connected mode:
The serving radio network node, e.g. the radio network node 220, stores information about the ongoing broadcast of a connected UE 210;
When a handover is initiated, the source RN node, e.g. the radio network node 220 includes information about the broadcast monitoring of the UE 210.
The target RN node, e.g. the radio network node 222, will indicate to the source node which carrier that is used for positioning AD broadcast and configure handover to that carrier In idle mode:
The UE 210 will realize after cell reselection that the carrier in the target radio network node e.g. the radio network node 222, does not broadcast positioning AD. Then it will
a. continue monitoring for positioning AD broadcast at other carriers/RATs, or
b. connect to the radio network node 220 and request to be handed over to a carrier/RAT where positioning AD is broadcasted, or
c. request positioning AD data via LPP as unicast.

Signaling Flow Subsets

The carrier/RAT reselection/redirection for positioning AD broadcast reception functionality is split between RRC, S1/N2, LPPa/NRPPa and LPP procedures.

The different embodiments, representing different signaling flow subsets, will be described in the following.

Radio Network Node-Based Redirection, UE 210 Triggered
The setup of the positioning AD broadcast follows the signaling steps of A relating to FIG. 4 as described above.
The UE may perform the following actions:
a. Obtains an indication from the location server 230 that broadcast is provided, but determines that the current carrier/RAT is not broadcasting positioning AD, as in steps of B in FIG. 4 which was described above;
b. Obtains carrier/RAT information from the location server upon request, optionally after first detecting that the current carrier/RAT is not broadcasting positioning AD, as in steps of B in FIG. 4 which was described above;
c. Detects that the current carrier/RAT is not broadcasting positioning AD, as in step B1 in FIG. 4 as described above.
Then, the UE 210 requests redirection to the serving radio network node 220 as in steps of E in FIG. 4, as described above.

Radio Network Node-Based Redirection, CN Triggered
The setup of the positioning AD broadcast follows the signaling steps of A relating to FIG. 4 as described above.
The UE 210 may perform the following actions:
a. Obtains an indication from the location server that broadcast is provided, but determines that the current carrier/RAT is not broadcasting positioning AD, as in steps of B in FIG. 4 which was described above;
b. Obtains carrier/RAT information from the location server upon request, optionally after first detecting that the current carrier/RAT is not broadcasting positioning AD, as in steps of B in FIG. 4 which was described above;
Then, the location server 230 and core network node 250 perform:
Location server 230 requests redirection to the core network node 250, which requests redirection to the serving radio network node 220 as in steps of D in FIG. 4, as described above.

UE 210 Based Redirection
The setup of the positioning AD broadcast follows the signaling steps of A in FIG. 4.
The UE 210 may follow the steps of B in FIG. 4 in different combinations:
a. Only step B1
b. Only steps B2 and B3
c. All steps of B
The UE 210 reselects the carrier/RAT as in steps of C in FIG. 4.

Handover

The setup of the positioning AD broadcast in the supporting radio network nodes follows the signaling steps of A in FIG. 4.

The handover procedure follows the signaling flows as described with reference to FIG. 5.

Text marked in yellow below corresponds to the method claims

Figure 6:
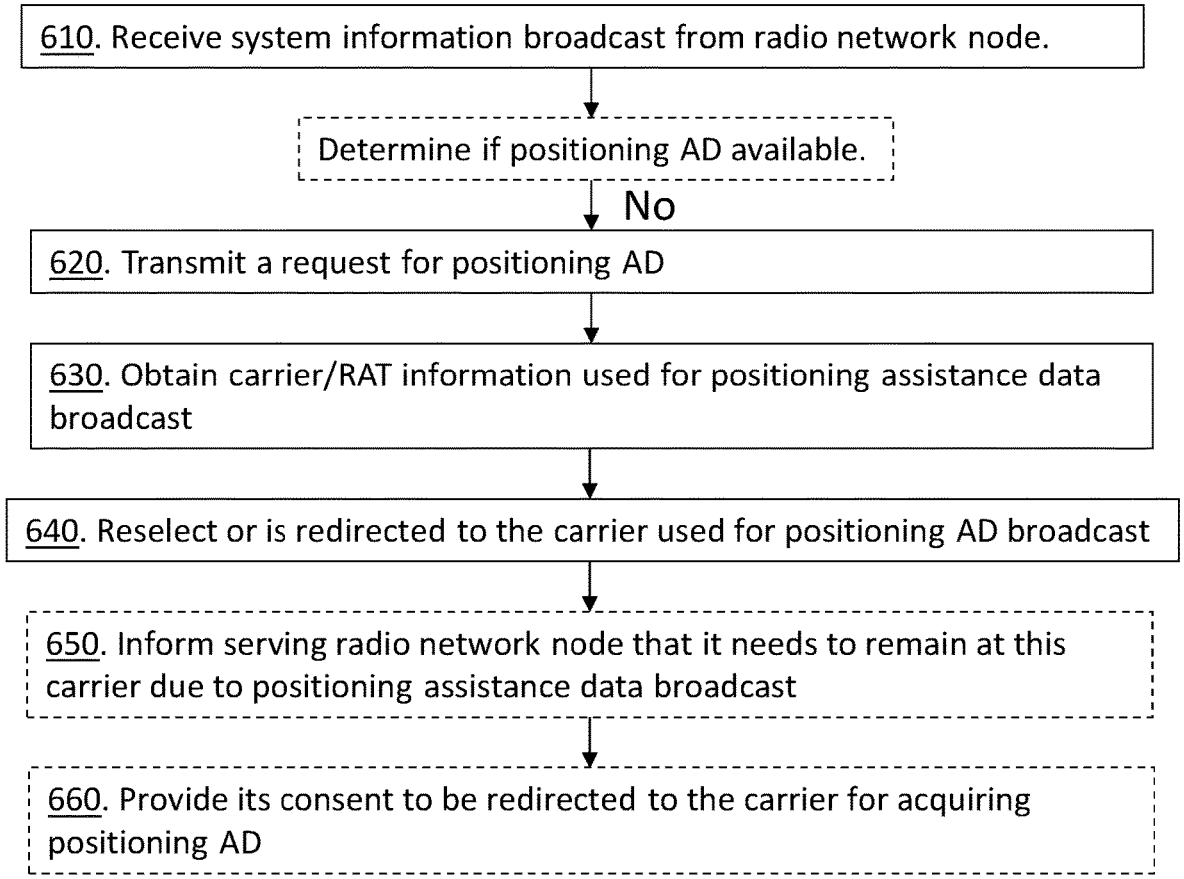
FIG. 6 is a flowchart depicting embodiments of a method performed by a UE.

An example flowchart depicting embodiments of a method performed by the UE or target device 210, e.g. to obtain positioning assistance data, is depicted in FIG. 6 and will be described more in detail in the following. The method may comprise one or more of the following actions which actions may be taken in any suitable order. Further, it should be understood that one or more actions may be optional and that actions may be combined.

Action 610

The UE 210 receives a system information broadcast from a serving radio network node, e.g. the radio network node 220.

The UE 210 may retrieve information from the serving radio network node broadcast and determine if positioning AD is available in the system information broadcast. This may be the broadcast of the positioning AD, confirming to the UE 210 that this is available in the serving/camping radio network node 220. This may also be information about which carrier/RAT that provides the positioning AD broadcast. The information may be provided in a system information block (SIB), for example SIB1, or a different SIB.

Action 620

In case the UE 210 does not obtain the needed positioning AD via the serving/camping cell broadcast transmitted by the radio network node 220, the UE 210 will trigger and send a request for the positioning AD to the location server 230. The request may then come via an RRC message from the UE 210 to the radio network node 220, where the message may include a flag or a new establishment, which cause the message to indicate a need for the positioning AD broadcast.

The UE 210 may send a request for the positioning AD to the location server 230 via LPP. In the message, the UE 210 may include information about the cell ID of the serving cell. The request message may be triggered by lack of broadcasted positioning AD in the serving/camping radio network node 220. The information may be a mobile originated location request to the core network node 250, e.g. MME in LTE.

The UE 210 may use a Mobile Origination Location Register (MO-LR) message to inform the MME that it wishes to initiate a location session. This message may be extended to include the request from the UE 210 about the interest or need of knowing the carrier where a positioning SIB, i.e. AD broadcast, is delivered.

The UE 210 may also indicate the request using an LPP message such as RequestAssitanceData or via a LPP UE capability that it supports positioning AD via broadcast. The LPP message exchange can be indicated via either control plane or user plane.

Action 630

The UE 210 obtains carrier/RAT information used for the positioning AD broadcast. The UE 210 may be explicitly informed about which carrier is used for the positioning AD broadcast. Alternatively, the response message may only confirm that the serving node, e.g. the radio network node 220, is broadcasting the positioning AD at some carrier/RAT.

The response may be in a ProvideAssistanceData message.

Action 640

The UE 210 reselects or is redirected to the carrier used for the positioning AD broadcast. The UE 210 may autonomously reselect to the carrier/RAT where the positioning AD broadcast is provided. The UE 210 may wait until it is released to idle and then reselect.

The UE 210 may request the serving radio network node 220 to be transferred to the specific carrier. In response, the UE 210 may obtain a redirect/inter-frequency handover/inter-RAT handover message from the serving radio network node 220.

Alternatively, when the UE 210 has been explicitly informed about which carrier that is used for positioning assistance data broadcast, it waits until the radio connection has been released and reselects the carrier when the positioning assistance data is broadcasted.

The UE 210 may be implicitly informed, typically by the location server 230, to request the serving radio network node 220 to be transferred to the correct carrier. In response, the UE 210 may obtain a redirect/inter-frequency handover/inter-RAT handover message from the serving radio network node 220.

Action 650

Optionally, when establishing a radio connection, the UE 210 may inform the serving radio network node 220 that it needs to remain at this carrier due to positioning assistance data broadcast.

Action 660

In some embodiments, the UE 210 may provide its consent to the NW, e.g. base station or location server, to be redirected for acquiring positioning AD, e.g. SIBs (pos-SIBs). The NW may ask for this consent from the UE 210 before making a decision to redirect.

An example flowchart depicting embodiments of a method performed by a base station or radio network node, such as the radio network node 220, is depicted in FIG. 7 and will be described more in detail in the following. The method may comprise one or more of the following actions which actions may be taken in any suitable order. Further, it should be understood that one or more actions may be optional and that actions may be combined.

Action 710

The radio network node 220 selects one or more carriers where Positioning SIB information, i.e. positioning AD, is to be broadcasted. The radio network node 220 may be requested by the location server 230, via LPPa/NRPPa, to broadcast the positioning AD.

As discussed above, the radio network node 220 may be configured to operate in different frequencies. For example, a serving radio network node, e.g. the radio network node 220 can redirect the UE 210 to a different carrier in order to perform load balancing. The radio network node 220 may have more capacity or bandwidth (BW) and larger coverage in one carrier than in another carrier. The network, e.g. the radio network node 220, may receive a message from the location server 230 that the UE 210 requests the positioning AD broadcast. Depending upon the number of positioning users, i.e. users requesting positioning AD, and where they are primarily located, e.g. indoor/outdoor etc., the radio network node 220 may select a carrier where positioning SIB information, i.e. positioning AD, shall be broadcasted.

The setup procedure of the positioning AD between the location server 230 and the radio network node 220 is the same as used when updating the positioning AD content for broadcast—the assistance data control. The broadcast is configured with the LPPa/NRPPa Assistance Information Control message.

Action 720

The radio network node 220 may inform the location server 230 about the assigned carrier/RAT for the broadcast. The radio network node 220 may optionally include information about the assigned or selected carrier/RAT for the broadcast in the Assistance Information Feedback message to the location server 230.

Action 730

The radio network node 220 broadcasts system information. The base station may configure in the SIB that it supports broadcast of AD which will then enable the UE 210 to request for positioning SIBs.

Action 740

The radio network node 220 may receive, via RRC, a request from the UE 210, to either remain at the current carrier broadcasting positioning AD or to be transferred to a carrier where the positioning AD is broadcasted.

In some embodiments, the UE 210 may provide its consent to the NW, i.e. the radio network node 220 or the location server 230, to be redirected for acquiring positioning SIBs (posSIBs). The NW may ask for this consent from the UE 210 before making a decision to redirect.

Action 750

The radio network node 220 may handover the UE 210 to the carrier/RAT that broadcasts the positioning AD.

The UE 210 requesting for positioning AD may be redirected by the radio network node 220 to that carrier.

The radio network node 220 may indicate a preference in the LPPa/NRPPa whether the location server 230 is allowed to perform redirection.

The radio network node 220, upon receiving a trigger from MME S1AP Downlink LPPa UE Associated Transfer (LPPa PDU), may redirect the UE 210 to the carrier where the positioning AD is broadcasted. The RRC Connection Release message may be used. A new release cause may be used such as RedirectToPositioningCarrier.

Figure 8:
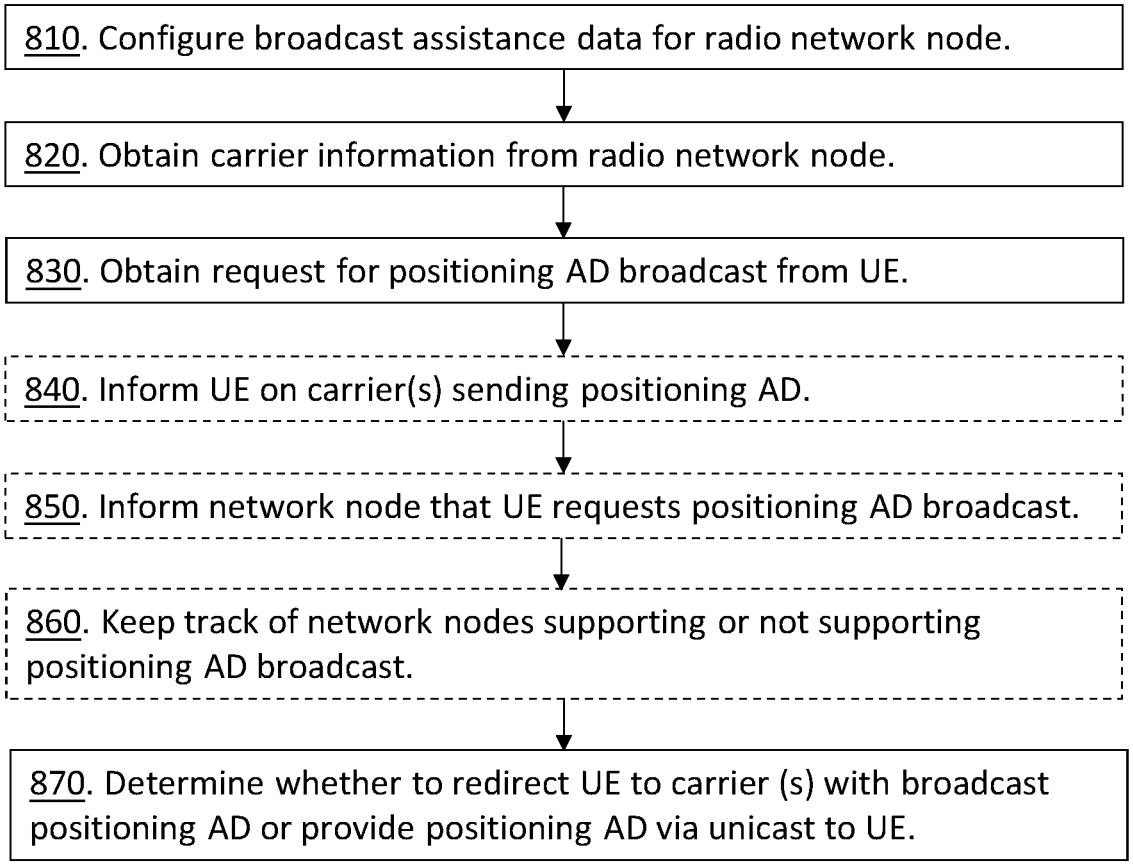
FIG. 8 is a flowchart depicting embodiments of a method performed by a location server.

An example flowchart depicting embodiments of a method performed by a location server 230 e.g. to provide the positioning AD, is depicted in FIG. 8 and will be described more in detail in the following. The method may comprise one or more of the following actions which actions may be taken in any suitable order. Further, it should be understood that one or more actions may be optional and that actions may be combined.

Action 810

The location server 230 configures the broadcast positioning AD for the radio network node 220, e.g. prepares, categorizes and provides RTK broadcast assistance data to the radio network node 220.

Action 820

The location server obtains the carrier information in the LPPa/NRPPa from the radio network node 220.

Action 830

The location server 230 obtains a request for the positioning AD broadcast from the UE 210.

Action 840

The location server 230 may inform the UE 210 about the carrier and in some cases even redirect the UE 210 to that carrier based upon base station, i.e. radio network node, preference.

Action 850

The location server 230 may inform the radio network node 220, e.g. eNB, using the UE 210 associated message, that the UE 210 requests the positioning AD broadcast.

Action 860

The location server 230 may keep track of network nodes supporting or not supporting positioning AD broadcast.

In some cases, the posSIB broadcast carrier may be supported by one eNB, e.g. radio network node 220 and not supported by other neighbor eNBs, such as the radio network node 222. In such case, the location server 230 may keep track of which eNB supports and which does not. The eNBs may provide the information about the posSIB carrier information to the location server 230.

Action 870

The location server 230 determines whether to redirect the UE 210 to the carrier(s) with broadcast positioning AD or provides positioning AD via unicast to the UE 210.

In an embodiment, based upon the UE 210 location and based upon the UE's measurement result, for instance obtained from E-CID, RSRP/RSRQ results of the target frequency, the location server 230 may decide whether to redirect the UE 210 for the broadcast or provide AD via unicast.

Figure 9:
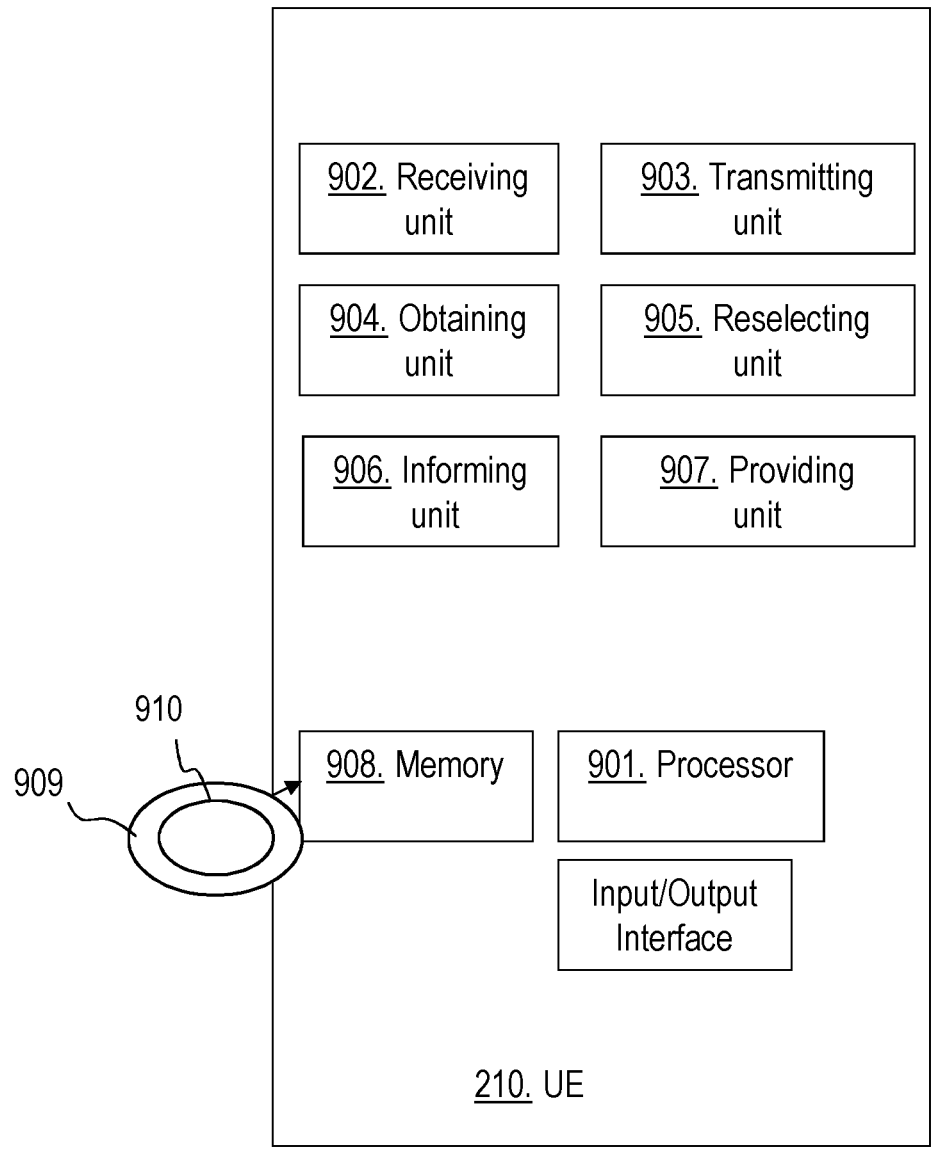
FIG. 9 is a schematic block diagram illustrating a UE according to some embodiments herein.

To perform at least some of the method actions illustrated in FIG. 6, the UE 210 may comprise the arrangement depicted in FIG. 9.

The UE 210 may comprise a processing circuitry 901, e.g. one or more processors, configured to perform the methods herein.

The UE 210 may comprise a receiving unit 902. The UE 210, the processing circuitry 901, and/or the receiving unit 902 is configured to receive the system information broadcast from the radio network node 220.

The UE 210 may comprise a transmitting unit 903. The UE 210, the processing circuitry 901, and/or the transmitting unit 903 is configured to transmit the request for positioning assistance data to the location server 230 in case the UE 210 does not obtain the needed positioning assistance data via the radio network node 220 broadcast system information.

The UE 210 may comprise an obtaining unit 904. The UE 210, the processing circuitry 901, and/or the obtaining unit 904 is configured to obtain carrier and/or RAT information used for the positioning assistance data broadcast.

The UE 210 may comprise a reselecting unit 905. The UE 210, the processing circuitry 901, and/or the reselecting unit 905 is configured to reselect or redirect the carrier and/or RAT used for the positioning assistance data broadcast.

The UE 210 may comprise an informing unit 906. The UE 210, the processing circuitry 901, and/or the informing unit 906 may be configured to inform the radio network node that it needs to remain at the reselected carrier or the carrier being directed to, due to positioning assistance data broadcast.

The UE 210 may comprise a providing unit 907. The UE 210, the processing circuitry 901, and/or the providing unit 907 may be configured to provide its consent to be redirected to the carrier for acquiring positioning assistance data.

Those skilled in the art will also appreciate that the schematically shown units in the UE 210 described above may refer to a combination of analog and digital circuits, and/or one or more processors configured with software and/or firmware, e.g. stored in the UE 210, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The UE 210 may comprise an input and output interface configured to communicate with one or more other network nodes. The input and output interface may comprise a wireless receiver (not shown) and a wireless transmitter (not shown).

The embodiments herein may be implemented through a respective processor or one or more processors, such as the processor 901 of a processing circuitry in the UE 210, together with respective computer program code for performing the functions and actions of the embodiments herein. The program code mentioned above may also be provided as a computer program product 909, for instance in the form of a data carrier carrying a computer program code 910 for performing the embodiments herein when being loaded into the UE 210. One such carrier may be in the form of a CD ROM disc. It is however feasible with other data carriers such as a memory stick. The computer program code may furthermore be provided as pure program code on a server and downloaded to the UE 210.

The UE 210 may further comprise a memory 908 comprising one or more memory units. The memory comprises instructions executable by the processor in UE 210.

The memory is arranged to be used to store e.g. data, configurations, and applications to perform the methods herein when being executed in the UE 210.

Figure 10:
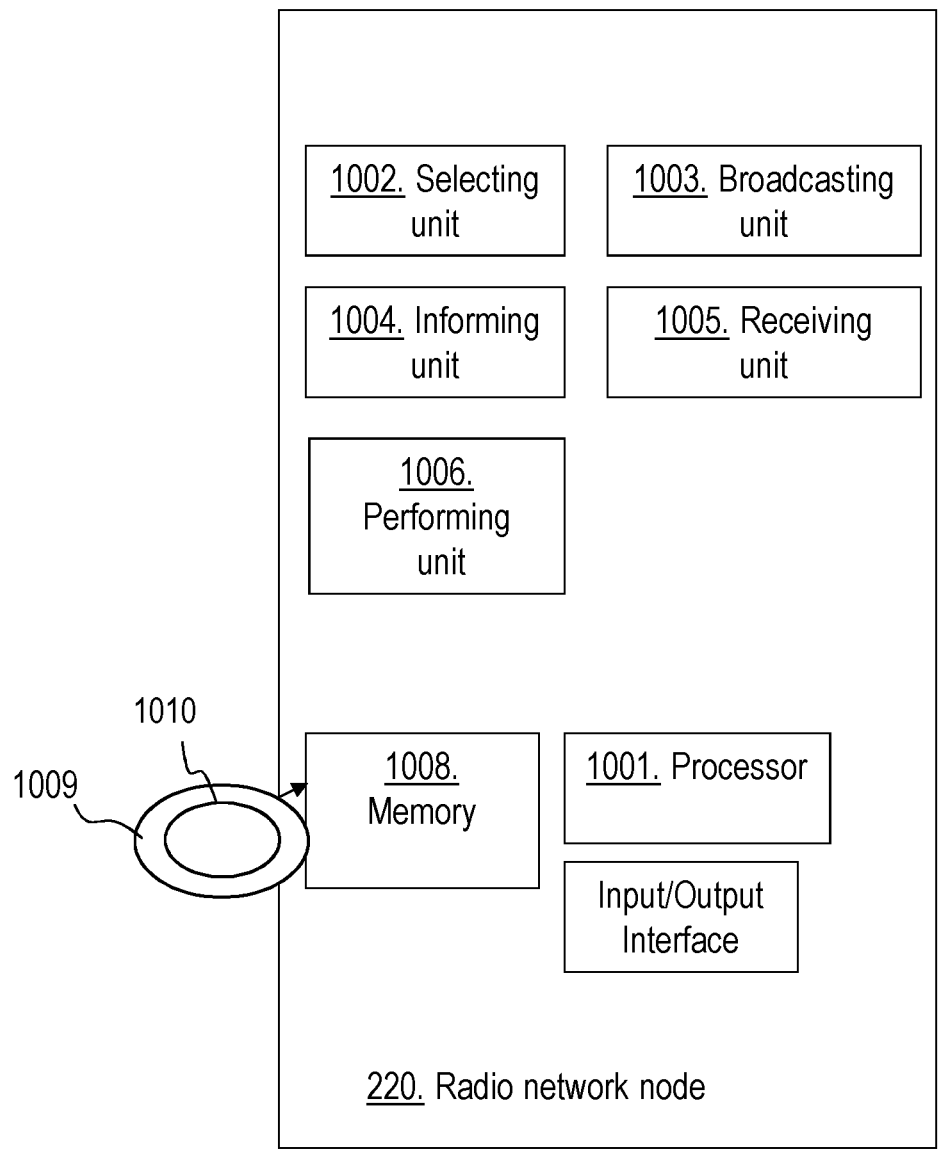
FIG. 10 is a schematic block diagram illustrating a radio network node according to some embodiments herein.

To perform at least some of the method actions illustrated in FIG. 7, the radio network node 220 may comprise the arrangement depicted in FIG. 10.

The radio network node 220 may comprise processing circuitry 1001, e.g. one or more processors, configured to perform the methods herein.

The radio network node 220 may comprise a selecting unit 1002. The radio network node 220, the processing circuitry 1001, and/or the selecting unit 1002 is configured to select one or more carriers where positioning system information is to be broadcasted.

The radio network node 220 may comprise a broadcasting unit 1003. The radio network node 220, the processing circuitry 1001, and/or the broadcasting unit 1003 is configured to broadcast the positioning system information.

The radio network node 220 may comprise an informing unit 1004. The radio network node 220, the processing circuitry 1001, and/or the informing unit 1004 may be configured to inform the location server 230 about the assigned carrier and/or RAT for the broadcast.

The radio network node 220 may comprise a receiving unit 1005. The radio network node 220, the processing circuitry 1001, and/or the receiving unit 1005 may be configured to receive a request from the UE 210 to either remain at the current carrier broadcasting positioning assistance data or to be transferred to a carrier where positioning assistance data is broadcasted.

The radio network node 220 may comprise a performing unit 1006. The radio network node 220, the processing circuitry 1001, and/or the performing unit 1006 may be configured to perform a handover of the UE 210 to the carrier and/or RAT that broadcasts the positioning assistance data.

Those skilled in the art will also appreciate that the schematically shown units in the radio network node 220 described above may refer to a combination of analog and digital circuits, and/or one or more processors configured with software and/or firmware, e.g. stored in the radio network node 220, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The radio network node 220 may comprise an input and output interface configured to communicate with one or more other network nodes. The input and output interface may comprise a wireless receiver (not shown) and a wireless transmitter (not shown).

The embodiments herein may be implemented through a respective processor or one or more processors, such as the processor 1001 of a processing circuitry in the radio network node 220, together with respective computer program code for performing the functions and actions of the embodiments herein. The program code mentioned above may also be provided as a computer program product 1009, for instance in the form of a data carrier carrying a computer program code 1010 for performing the embodiments herein when being loaded into the radio network node 220. One such carrier may be in the form of a CD ROM disc. It is however feasible with other data carriers such as a memory stick. The computer program code may furthermore be provided as pure program code on a server and downloaded to the radio network node 220.

The radio network node 220 may further comprise a memory 1008 comprising one or more memory units. The memory comprises instructions executable by the processor in the radio network node 220.

The memory is arranged to be used to store e.g. data, configurations, and applications to perform the methods herein when being executed in the radio network node 220.

Figure 11:
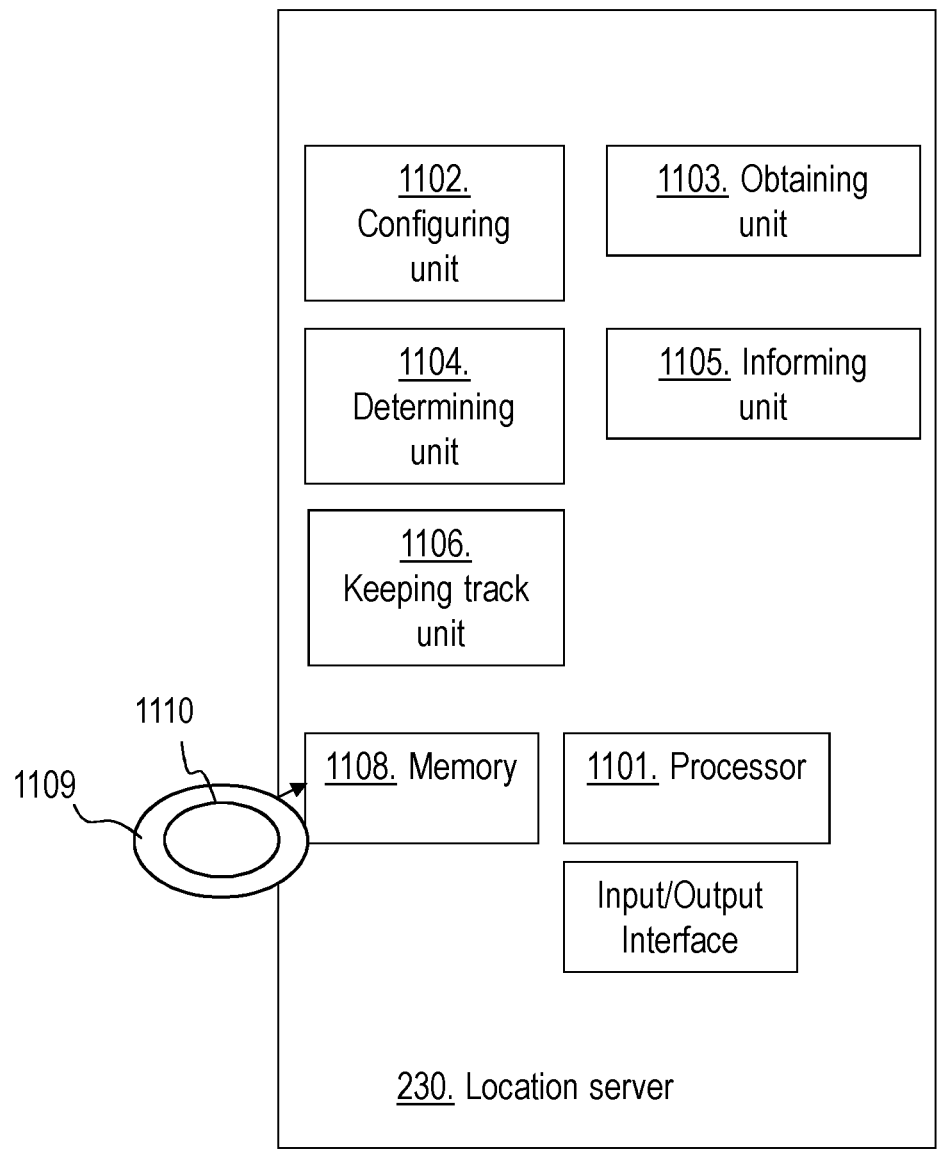
FIG. 11 is a schematic block diagram illustrating a location server according to some embodiments herein.

To perform at least some of the method actions illustrated in FIG. 8, the location server 230 may comprise the arrangement depicted in FIG. 11.

The location server 230 may comprise a processing circuitry 1101, e.g. one or more processors, configured to perform the methods herein.

The location server 230 may comprise a configuring unit 1102. The location server 230, the processing circuitry 1101, and/or the configuring unit 1102 is configured to configure broadcast assistance data for the radio network node 220.

The location server 230 may comprise an obtaining unit 1103. The location server 230, the processing circuitry 1101, and/or the obtaining unit 1103 is configured to obtain carrier information from the radio network node 220.

The location server 230, the processing circuitry 1101, and/or the obtaining unit 1103 is configured to obtain the request for the positioning assistance data broadcast from the UE 210.

The location server 230 may comprise a determining unit 1104. The location server 230, the processing circuitry 1101, and/or the determining unit 1104 is configured to determine whether to redirect the UE 210 to the carrier with broadcast positioning assistance data or to provide positioning assistance data via unicast to the UE 210.

The radio network node 220 may comprise an informing unit 1105. The location server 230, the processing circuitry 1101, and/or the informing unit 1105 may be configured to inform the UE 210 about the carrier The location server 230, the processing circuitry 1101, and/or the informing unit 1105 may be configured to inform the radio network node 220 using the UE associated message that the UE 210 is adapted to request the positioning assistance data broadcast The location server 230 may comprise a keeping track unit 1106. The location server 230, the processing circuitry 1101, and/or the keeping track unit 1106 may be configured to keep track of radio network nodes supporting or not supporting the positioning assistance data broadcast.

Those skilled in the art will also appreciate that the schematically shown units in the location server 230 described above may refer to a combination of analog and digital circuits, and/or one or more processors configured with software and/or firmware, e.g. stored in the location server 230, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The location server 230 may comprise an input and output interface configured to communicate with one or more other network nodes. The input and output interface may comprise a wireless receiver (not shown) and a wireless transmitter (not shown).

The embodiments herein may be implemented through a respective processor or one or more processors, such as the processor 1101 of a processing circuitry in the location server 230, together with respective computer program code for performing the functions and actions of the embodiments herein. The program code mentioned above may also be provided as a computer program product 1109, for instance in the form of a data carrier carrying a computer program code 1110 for performing the embodiments herein when being loaded into the location server 230. One such carrier may be in the form of a CD ROM disc. It is however feasible with other data carriers such as a memory stick. The computer program code may furthermore be provided as pure program code on a server and downloaded to the location server 230.

The location server 230 may further comprise a memory 1108 comprising one or more memory units. The memory comprises instructions executable by the processor in the location server 230.

The memory is arranged to be used to store e.g. data, configurations, and applications to perform the methods herein when being executed in the location server 230.

Some embodiments of the UE 210 may comprise:
a radio circuitry configured to transmit one or more requests to the location server 230, to provide logical position information to the location server 230, and to obtain positioning assistance data from the location server 230;
a storage configured to store logical position information and positioning assistance data; and
a processing unit configured to determine a position based on received positioning assistance data.

Some Example Embodiments:

Embodiment 1. A method performed by a UE (210) to obtain positioning assistance data from a location server (230), wherein the UE (210) and the location server (230) are operating in a wireless communications network (200), and wherein the method comprises:
receiving (610) system information broadcast from a serving network node;
sending (620) a request for positioning AD to a location sever in case the UE does not obtain the needed positioning AD via the serving/camping node broadcast system information;
obtaining (630) carrier/RAT information used for positioning assistance data broadcast;
reselecting or being redirected (640) to the carrier/RAT used for positioning assistance data broadcast.

When using the word "comprise" or "comprising" it shall be interpreted as non-limiting, i.e. meaning "consist at least of".

The embodiments herein are not limited to the above described example embodiments. Various alternatives, modifications and equivalents may be used.

The invention claimed is:

1. A method performed by a User Equipment (UE) for obtaining positioning assistance data from a location server, the UE and the location server operating in a wireless communications network, the method comprising:
   receiving a system information broadcast from a radio network node;
   transmitting a request for positioning assistance data to the location server in case the UE does not obtain the needed positioning assistance data via the radio network node broadcast system information;
   obtaining at least one of carrier and Radio Access Technology (RAT) information used for the positioning assistance data broadcast from the location server; and
   one of reselecting and redirecting to the at least one of the carrier and the RAT used for the positioning assistance data broadcast;
   the reselecting being autonomous and being based on UE a measurement report of at least one of Reference Signal Received Power (RSRP) and Reference Signal Received Quality (RSRQ) results of a target frequency;
   the redirecting being based on at least one of a redirection flag in the carrier and the RAT information to redirect the UE to at least one of the carrier and the RAT.

2. The method according to claim 1, further comprising:
   informing the radio network node that it needs to remain at the reselected carrier or the carrier being directed to, due to positioning assistance data broadcast.

3. The method according to claim 1, further comprising:
   providing its consent, to the at least one of the location server and the radio network node, to be redirected to the carrier for acquiring positioning assistance data.

4. A method performed by a location server for providing positioning assistance data, the location server operating in a wireless communications network, the method comprising:
   configuring broadcast assistance data for a radio network node;
   obtaining carrier information from the radio network node;
   obtaining a request for a positioning assistance data broadcast from a User Equipment (UE);
   informing the UE about the carrier; and
   determining whether one of to redirect the UE to a carrier with broadcast positioning assistance data and to provide positioning assistance data via unicast to the UE, the determining being based on at least one of the UE location and the UE's measurement result, the determining being further based on a UE measurement report at least one of Reference Signal Received Power (RSRP) and Reference Signal Received Quality (RSRQ) results of a target frequency.

5. The method according to claim 4, further comprising:
   informing the radio network node using a UE associated message, that the UE requests the positioning assistance data broadcast.

6. The method according to claim 4, further comprising:
   keeping track of radio network nodes supporting or not supporting the positioning assistance data broadcast.

7. A User Equipment, (UE) for obtaining positioning assistance data from a location server, the UE and the location server operating in a wireless communications network, the UE being configured to:
- receive a system information broadcast from a radio network node;
- transmit a request for positioning assistance data to the location server in case the UE does not obtain the needed positioning assistance data via the radio network node broadcast system information;
- obtain at least one of carrier and Radio Access Technology (RAT) information to be used for a positioning assistance data broadcast from the location server; and
- one of reselect and redirect at least one of the carrier and the RAT to be used for the positioning assistance data broadcast;
- the reselecting being autonomous and being based on UE a measurement report of at least one of Reference Signal Received Power (RSRP) and Reference Signal Received Quality (RSRQ) results of a target frequency;
- the redirecting being based on at least one of a redirection flag in the carrier and the RAT information to redirect the UE to at least one of the carrier and the RAT.

8. The UE according to claim 7, further being configured to:
- inform the radio network node that it needs to remain one of at the reselected carrier and the carrier being directed to, due to positioning assistance data broadcast.

9. The UE according to claim 8, further being configured to:
- provide its consent, to at least one of the location server and the radio network node, to be redirected to the carrier for acquiring positioning assistance data.

10. A location server for providing positioning assistance data, the location server operating in a wireless communications network, and the location server comprising a controller and a non-transitory computer storage memory storing computer-executable instructions which, when executed by the controller, cause the controller to:
- configure broadcast assistance data for a radio network node;
- obtain carrier information from the radio network node;
- obtain a request for a positioning assistance data broadcast from a User Equipment (UE);
- inform the UE about the carrier; and
- determine whether to redirect the UE to a carrier with broadcast positioning assistance data or to provide positioning assistance data via unicast to the UE, the determining being based on at least one of the UE location and the UE's measurement result, the determining being further based on a UE measurement report at least one of Reference Signal Received Power (RSRP) and Reference Signal Received Quality (RSRQ) results of a target frequency.

11. The location server according to claim 10, further being configured to:
- inform the radio network node using a UE associated message, that the UE is configured to request the positioning assistance data broadcast.

12. The location server according to claim 10, further being configured to:
- keep track of radio network nodes supporting or not supporting the positioning assistance data broadcast.

* * * * *